Jan. 11, 1966       W. R. COWAN       3,228,543
BOAT TRAILER
Original Filed Aug. 22, 1960       2 Sheets-Sheet 2
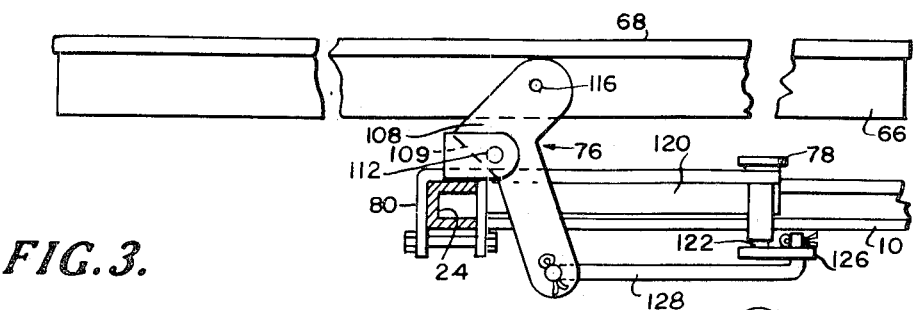
FIG. 3.
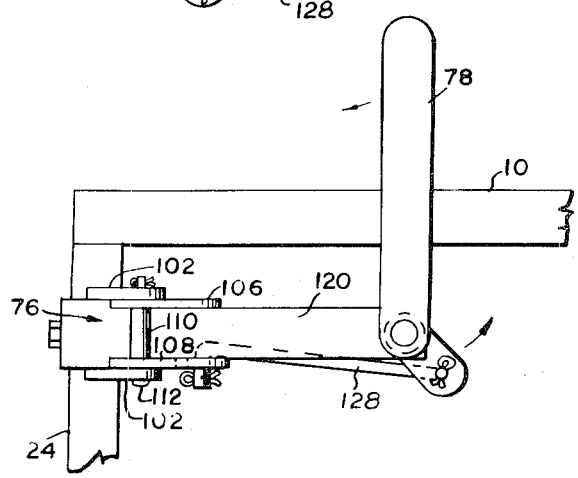
FIG. 4.
FIG. 2.
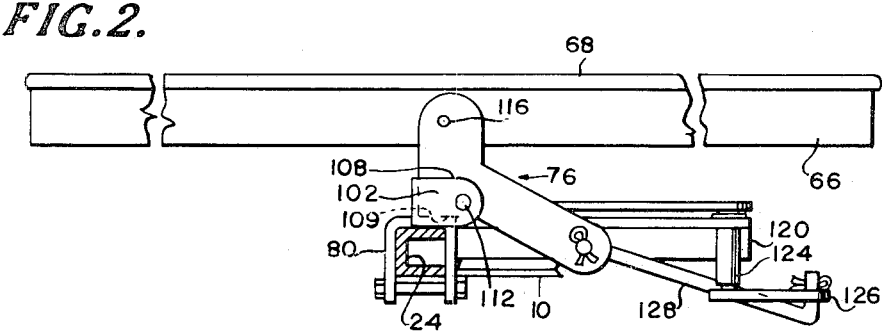
Inventor
WILLIAM R. COWAN
By Cushman, Darby & Cushman
Attorneys

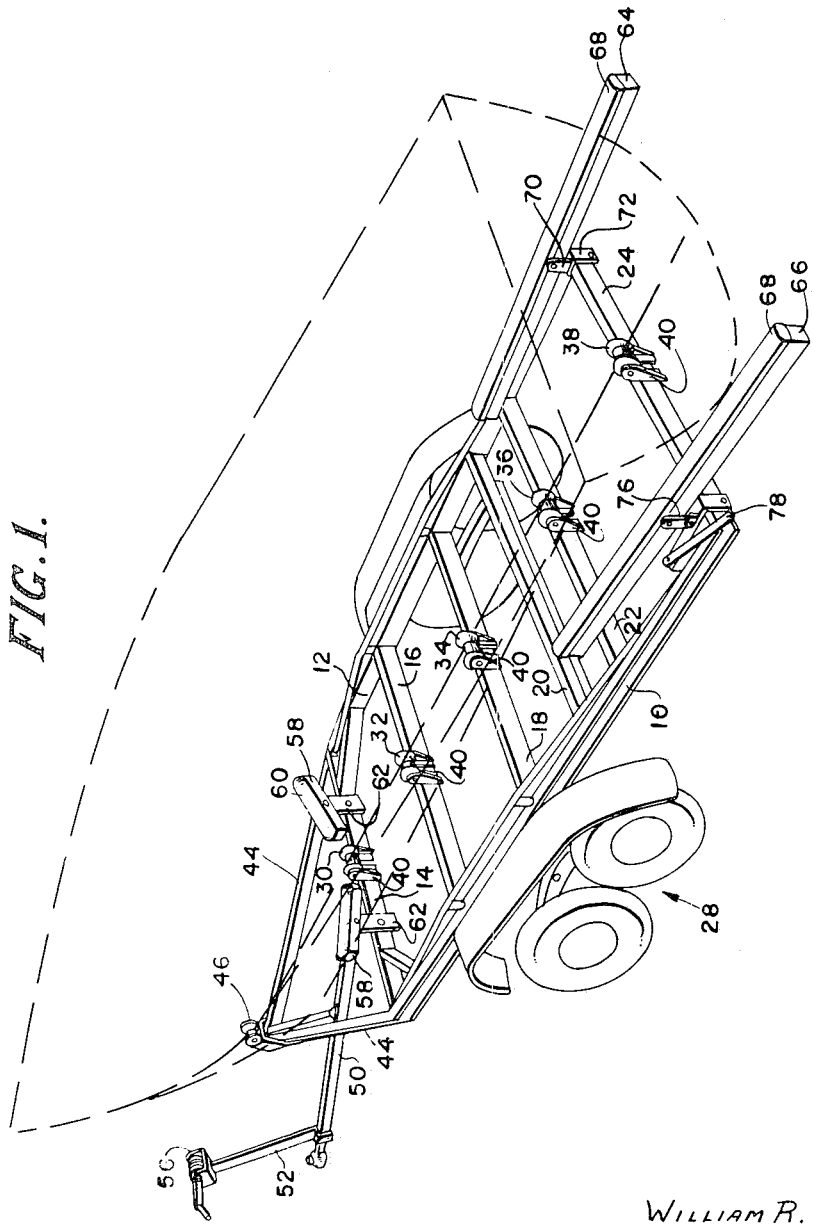

United States Patent Office 3,228,543
Patented Jan. 11, 1966

3,228,543
BOAT TRAILER
William R. Cowan, P.O. Box 4513, Fort Worth, Tex.
Continuation of application Ser. No. 51,024, Aug. 22, 1960. This application June 16, 1964, Ser. No. 375,594
8 Claims. (Cl. 214—84)

This application is a continuation of my application Serial No. 51,024, filed August 22, 1960, now abandoned. Application Serial No. 51,024 is a continuation-in-part of application Serial No. 724,131, filed March 26, 1958, now abandoned.

This invention relates to a boat trailer. More particularly, it relates to a boat trailer having improved means for launching and loading boats and, further, improved means for maintaining a boat on the trailer in a manner, and in a position, wherein undesirable straining of the structure of the boat is minimized.

Such an undesirable straining of the structure of the boat is obtained when it is supported for long periods of time with the major portion of its weight resting upon its keel. It is therefore within the contemplation of this invention that a boat may be loaded upon a trailer by sliding its keel over a series of keel rollers but that when the boat is properly longitudinally positioned relative to the trailer, the major portion of its weight will be taken up by cradles contacting the surfaces of the hull.

It is an object of this invention to provide a trailer which is simply and lightly constructed, yet which is uniquely adopted to the task of loading and launching of a boat.

It is a further object of this invention to provide a boat trailer which may be easily hauled by an ordinary passenger car and provides both ease of loading and an improved manner of maintaining a boat loaded thereon.

It is another object of this invention to provide a boat trailer with means which greatly facilitate launching and loading and with which the launching and loading operation can be accomplished with the major portion of the trailer, including the wheels, on dry land and yet provides a new and improved manner of maintaining the boat, when the latter is loaded, in such a way that undesirable strains upon the boat structure are avoided.

It is another object of this invention to provide a boat trailer which engages the boat along the keel during both launching and loading operations but which maintains the boat by supporting the transom, with at least the rear portions of the keel being free of the rollers when the boat is fully loaded and the trailer is ready to be transported.

These and other objects of this invention will be fully understood from the following detailed description of a typical preferred form and application of the invention, throughout which description reference is made to the accompanying drawings in which:

FIGURE 1 is a perspective view of a boat trailer embodying the invention;

FIGURE 2 is an enlarged side view of the apparatus for lifting the transom cradle with the transom cradle in its upper or "loaded" position;

FIGURE 3 is an enlarged side view of the apparatus for lifting the transom cradle with the transom cradle in its lower or "loading" position;

FIGURE 4 is an enlarged plan view of the apparatus for shifting the transom cradle with the transom cradle in its lower or "loading" position, but with the transom cradle omitted to give a better view of the other elements.

Referring more particularly to the drawings, it will be seen that the main frame is formed of a pair of longitudinally extending transversely spaced structural members 10, 12, which are riveted, welded, or otherwise attached to a series of transversely extending brace members 14, 16, 18, 20, 22 and 24. While the respective elements of the frame are here described as being initially separate elements, and joined together to define the entire frame, it should be here stated that this is done for ease of definition, and it must be understood that it is within the contemplation of his invention that one or more groups of these elements may be formed of a single structural item, such as a metallic tube bent, or otherwise formed, to define several of the respective elements discussed above.

The frame is mounted upon conventional wheel and axle means, generally indicated at 28, which may be provided on conventional leaf, or other, springs so as to avoid unnecessary jarring of the boat carried on the trailer during transit. As many such means are well known, and any one of several types may be used in connection with this invention, it is thought that they need not be described in detail.

As best shown in FIGURE 1, a number of keel supporting rollers 30, 32, 36 and 38, are mounted in a line extending longitudinally of the trailer, this line being equally spaced from either frame side member. In the preferred embodiment illustrated, one keel roller is mounted on each brace member, save brace member 20, but it should be understood that it is within the contemplation of the invention that two rollers might be mounted on a given brace member, that is to say, one on the front side and one on the rear side, or in some cases it may be preferred to dispense with one or more of the keel rollers, the choice depending, of course, upon the size and configuration of the boat with which the boat trailer is to be used. However, in any case, all of the keel rollers are longitudinally aligned in the manner described hereinabove and all pivotally mounted upon roller brackets 40 which are bolted to the brace member but which can be adjusted in height relative thereto by the conventional nut and bolt and slot arrangement, or by other means.

Extending obliquely forwardly and inwardly and slightly upwardly from the main portion of the frame are two bow supporting members 44. At their junction there is mounted a bow roller 46 which may be similar in structure to the keel rollers 30–38 already discussed.

Also extending forwardly from the main frame portion of the trailer is a tongue 50 having a winch stand 52 affixed to extend obliquely upward and forwardly from a point adjacent the free end thereof, the latter being provided with conventional attachment means 54 for attachment with a draft vehicle. A hand operated winch 56 is mounted upon the free end of the winch stand for use in a manner which is well known in the art but will nevertheless be discussed in detail hereinafter.

At the forward portion of the frame, and, in the preferred embodiment, at the location of the most forwardly brace member 14, there is provided a pair of transversely spaced pivotally mounted cradles 58, which are provided with a suitable padding material 60 on the upper surface thereof. Each of the cradless are pivotally mounted on longitudinally (of the trailer) extending axes upon the cradle brackets 62 which are bolted to the brace member 14. The latter attachment may be made adjustable, as by the conventional nut and bolt and slot arrangement, so that the cradles may be vertically adjusted to best suit the particular boat to be carried on the trailer, but the cradle brackets are not moved during the loading or unloading operations, and may be considered as permanently fixed in position at those times.

Turning now to the rear portion of the trailer, it will be seen that two laterally spaced longitudinally extending transom cradles 64, 66 are pivotally mounted on transversely extending axes for movement in a vertical plane parallel with the longitudinal axis of the trailer. These axes are directly above the rearmost transverse brace member 24 and are transversely aligned one with the other and with the transverse brace member. Each of the transom cradles have their upper surfaces provided with suitable padding material 68 to protect the finish of the boat to be mounted thereon.

One of the transom cradles, in this case the right hand transom cradle 64, has its bracket immovably affixed, as by welding, riveting, or the like, on a saddle 72, formed by an inverted U-shaped bracket, which straddles the brace member 14 and has its free ends drawn together by a drawbolt to form a fast connection with the brace member. As will be evident, this draw may be loosened to free the saddle 72 of the brace member 24 so that it may be moved along the latter to a position best suiting the particular boat to be mounted upon the trailer. However, during the period of use of the trailer, and the loading and unloading thereof, the bracket 70 may be considered as fixed relative to the rearmost brace member 24.

The other longitudinally extending transom cradle 66 is also connected to a cradle bracket 76 but the latter is not fixed in position relative to the rear frame brace member 24 but rather is movable relative thereto in a vertical plane parallel to the longitudinal axis of the trailer. This movable bracket is so constructed, mounted, and arranged that the pivot point of the transom cradle does, when moved forwardly, from its normal or "loaded" position, rise slightly and then descend to a point several inches below its previous level to a second position hereinafter defined as the "loading" position. These movements are obtained by selective rotative manipulation of a handle 78 through approximately 90°, by mechanisms which will be described in detail hereinafter.

When the movable longitudinally extending transom cradle 66 is in its "loaded" position, and a boat is mounted on the trailer, the keel of the boat is free of the keel rollers 34. The prow of the boat bears against the bow rollers 46 with the forward portions of the hull being supported by transversely extending cradles 58 (which pivotally adjust themselves to the most advantageous position for contacting the boat) and the transom is supported by the transom cradles 64 and 66.

When the boat is to be launched the trailer is backed up to the water and then tilted so that the stern of the boat is directed obliquely downwardly towards the water. The handle 78 is then selectively rotatably manipulated through 90° to drop the movable transom cradle 66 to its lower or "loading" position. If the keel rollers 30–38 have been properly adjusted to the correct vertical positions (relative to the particular boat with which the trailer is used) this movement lowers the boat sufficiently to allow its keel to contact and bear upon these rollers, at which time the weight of the boat, which was formerly borne by the transom cradles 64, 66, and the forward cradles 58, is completely taken up by the rollers. By selectively paying out the cable from the winch, the boat is then allowed to roll along the rollers, on its keel, until it contacts the water and then commences to float thereon.

It should be understood that the operator may prefer to lower the boat to bear upon the keel rollers prior to tilting the trailer to the oblique position, and that this variation in sequence will in no way affect the fundamental operation of the invention.

The boat is loaded on the trailer by a procedure which is the exact reverse of the unloading procedure. That is to say, the trailer is tilted until it points obliquely downwardly towards the water and the boat is floated to a position wherein it is longitudinally aligned with the trailer and then drawn thereto by use of the cable and winch 56. Normally the keel will first engage the keel roller 38 and will then engage the other keel rollers as the boat is drawn up on the trailer. When the prow of the boat is snug against the bow roller 46, with the forward portions of the boat contacting the transversely extending pivotally mounted cradles 58, the entire weight of the boat is borne by the rollers 30–38. The handle 78 is then returned, by rotative manipulation through an angle of approximately 50°, to its original position. As has been explained, this effects an upward movement of the movable transom cradle 66 which is sufficient to lift the boat from the keel rollers so that the entire weight of the boat is then borne by the transom cradles 64, 66 and the forward cradles 58.

The mechanisms through which these movements of the transom cradle 66 are obtained will now be described.

Referring more particularly to FIGURES 2 and 3, an inverted saddle 80 straddles the transversely extending rear brace member 24. In the embodiment shown, the latter member is a channel and the saddle is formed by an inverted U-shaped bracket, but it should be understood that if some other configuration is used, the U-shaped bracket will have to be appropriately modified so that its crotch conforms to the sectional configuration thereof. In any event, the free ends of the downwardly extending legs of the saddle 80 may be drawn together by a drawbolt to form a fast connection with the brace member 24, the arrangement being such that the draw may be loosened to free the saddle of the brace member so that it may be moved along the latter to a position best suiting the particular boat to be mounted on the trailer.

The upper face of the base of the inverted U-shaped member 80 has a pair of transversely opposed and spaced upstanding wings or flanges 102 formed thereon, or welded or otherwise attached thereto. These flanges project over one edge, in this preferred embodiment the forward edge, of the brace member 24.

A bracket, generally indicated at 76, is pivotally mounted between the wings 102 for movement in a vertical plane parallel to the longitudinal axis of the trailer. This bracket is defined by three separate elements joined together to form a unitary structure, that is to say, a lever arm 106 and a bell crank 108, having one leg congruent with the lever arm, are aligned and spaced one from the other and joined together by a hollow bearing shaft 110 which is welded or otherwise affixed to both. The bracket 76 is pivotally engaged to the wings 102 by a pin 112 extending through transversely extending holes in the wings and through the hollow bearing shaft 110. The axes of the holes in the wings, and hence of the pin 112, are, as best shown in FIGURES 2 and 4, directly over the forward (of the trailer) leg of the saddle 80.

As is also shown in FIGURES 2 and 4, the transom cradle 66 is pivotally mounted to the bracket 76 by a pin 116 extended therethrough and through transversely extending and aligned holes in the lever arm 106 and the upper arm of the bell crank 108 near the upper free ends thereof.

As shown in FIGURE 2, when the transom is in its higher or "loaded" position, the axis of the pin 116 is somewhat to the rear of the axis of pin 112, so that the weight of the transom 66 (and of a boat thereon) creates a moment tending to hold the bracket in that position, with the underside 109 of the upper arm of the bell crank 108 abutting the upper surface of the inverted U-shaped member 80.

It will be evident that when the lower arm of the bell crank 108 is moved rearwardly (of the trailer), the upper arm will move forwardly, with the axis of the pivot pin 116, and the pivot point of the transom cradle 66, moving slightly upwardly and then forwardly and downwardly. Such a movement will continue until the rear surface of the downwardly extending lower arm of the bell crank 108 contacts the outside surface of the forewardmost leg of the inverted U-shaped member 80, or until otherwise stopped, at which time the bracket 76 is considered to be in its lower or "loading" position.

This movement of the bracket 76 from one position to the other is effected by an operating lever arrangement which is engaged with the handle 78. As shown in FIGURES 2, 3 and 4, the operating handle 78 is pivotally mounted on an arm 120 which is welded, or otherwise attached, to the outside surface of the forwardmost leg of the inverted U-shaped member 80 and extends forwardly therefrom. The operating handle 78 is fixed to the upper end of a stub shaft 122 which extends downwardly through a vertically disposed bearing 124 fitted adjacent the free end of the arm 120. An operating lever arm 126 is welded, or otherwise attached, to the lower end of the stub shaft and extends radially therefrom at an angle of approximately 130° from the operating handle 78. The free end of the operating lever 126 and the free end of the lower arm of the bell crank 108 are connected by an operating link 128 which consists of a shaft having its free ends bent at right angles to the axis of the shaft and to each other, with one free end projecting through an aperture at the end of the operating lever 126, and secured therein by a cotter key, and with the other end projecting through an aperture at the end of the lower arm of the bell crank 108, and secured therein by a cotter key.

It will now be evident that manipulation of the operating handle 78 from the position shown in FIGURE 4 in the direction of the arrows, that is to say, with the free end of the operating handle being moved towards the rear of the trailer, bracket 76 will move from its lower or "loading" position to its upper or "loaded" position shown in FIGURE 2, and that the shift from the "loaded" to the "loading" position is effected by an opposite manipulation of the handle.

It will now be understood that when the boat is being lifted or lowered by the vertical component of the movement of the bracket 76, the force required to be exerted by such bracket will be only a fraction of the entire weight of the boat if the transversely extending cradles 58, the longitudinally extending cradles 64, 66, and the rollers 30–38 have been adjusted to the proper position for use with that particular boat. It follows that in view of the mechanical advantage obtained by the mechanical linkage system which has just been explained, the manual force which must be applied to the handle 78 to obtain the vertical movement of the boat is quite nominal.

To achieve such a proper adjustment, the boat with which the trailer is to be used is mounted in the "loaded" position and the roller brackets 40 are then loosened from their respective brace members and adjusted to be free of the keel. For purposes of discussion in this specification, and in the claims made in connection with this specification, a keel roller is considered to be free of the keel if the latter does not bear upon it with any substantial force, the question of whether or not there is bare contact being of no practical importance.

In some instances it may be desirable to vertically adjust the forward cradle brackets 62, or to modify the transverse position of the saddles 72 and 80, and hence adjust the transverse positions of the transom cradles 64 and 66, to bring the respective elements into their desired relation with respect to a particular boat. When all of these elements have been properly placed, and bolted, or otherwise secured, firmly in position, the end effect will be that a relatively small vertical movement of the bracket 76, and hence of the vertically movable transom cradle 66, will be quite sufficient to lift the entire boat free (in the sense of the word explained hereinabove) of the keel rollers 30–38. In this operation the hull of the boat itself will act as a lever, with the transverse cradles 58 and the fixed transom cradle 64 acting as fulcrums, the center of gravity of the boat defining the location of the weight to be lifted, and a movable transom cradle 66 defining the point of applied force. Inasmuch as the center of gravity of the boat will obviously be between the point of applied force and a line drawn between the respective fulcrums, it is clear that a mechanical advantage in the approximate range of 1½ to 4 is obtained, depending upon the particular configuration of the boat in question, and a boat weighing 200 pounds may be lifted to the "loaded" position by the application of a very small force to the handle 76.

Having described only a typical preferred form and application of my invention, I do not wish to be limited or restricted to specific details herein set forth but wish to reserve to myself any variations or modifications that may appear to those skilled in the art and falling within the scope of the following claims.

I claim:

1. In a boat trailer the combination comprising a frame including a pair of spaced longitudinally extending side members, a plurality of brace members extending transversely between said side members, the rearmost of said brace members being located adjacent the rear ends of said side members; a plurality of longitudinally aligned keel rollers mounted between said side members; a pair of transversely spaced and aligned transversely extending cradles having upper surfaces for supporting the front portions of a boat, said cradles being mounted on the front portion of said frame; a pair of transom support cradles having upper surfaces for supporting a transom of a boat on the trailer, said transom cradles being transversely spaced and each being pivotally mounted on pivot support means mounted on said rearmost brace member; a first of said pivot support means being selectively movable in a vertical plane relative to the second; selectively operable leverage means for effecting this movement, the arrangement being such that when the first pivot support means is in a raised position the weight of a boat on the trailer is borne by the respective cradles and when the first pivot support means is in a lowered position at least a major portion of the weight of a boat on the trailer is borne by said keel rollers.

2. In a boat trailer the combination comprising a frame including a pair of spaced longitudinally extending side members, a plurality of brace members extending transversely between said side members, the rearmost of said brace members being located adjacent the rear ends of said side members; a plurality of longitudinally aligned keel rollers mounted between said side members; a pair of transversely spaced and aligned transversely extending cradles having upper surfaces for supporting the front portions of a boat, said cradles being mounted on the front portion of said frame; a pair of transom support cradles having upper surfaces for supporting a transom of a boat on the trailer, said transom cradles being transversely spaced and each being pivotally mounted on pivot support means mounted on said rearmost brace member; one of said pivot support means being selectively movable in a vertical plane relative to said rearmost brace member; selectively operable leverage means for effecting this movement; the second of said pivot support means being immobile relative to said rearmost brace member, the arrangement being such that when the first pivot support means is in a raised position the weight of a boat on the trailer is borne by the respective cradles and when the first pivot support means is in a lowered position at least a major portion of the weight of a boat on the trailer is borne by said keel rollers.

3. In a boat trailer the combination comprising a frame including a pair of spaced longitudinally extending side members, a plurality of brace members extending transversely between said side members; a plurality of longitudinally aligned keel rollers mounted midway between said side members; a pair of transversely spaced and aligned transversely extending cradles having upper surfaces for supporting the front portions of a boat, said cradles being mounted on the front portion of said frame; a pair of transom support cradles having upper surfaces for supporting a transom of a boat on the trailer, said transom cradles being transversely spaced and each being pivotally mounted upon a pivot support means attached to the rear portion of said frame; a first of said pivot support means being selectively movable in a vertical plane parallel to the longitudinal axes of the frame; the second of said pivot support means being immobile relative to said frame; pivot support operating means for selectively moving said first pivot support means from a first raised position to a second lower position, and to selectively reverse this movement, said last mentioned means being so arranged that a weight upon the first pivot support means will maintain the latter in its position until its position is changed by the application of external forces to said pivot support operating means, the arrangement of said cradles and said keel rollers being such that when the first pivot support means is in a raised position the weight of a boat on the trailer is borne by the respective cradles and when the first pivot support means is in a lowered position at least a major portion of the weight of a boat on the trailer is borne by said keel rollers.

4. In a boat trailer the combination comprising a frame including a pair of spaced longitudinally extending side members, a plurality of brace members extending transversely between said side members; a plurality of longitudinally aligned keel rollers mounted midway between said side members; a pair of cradles having upper surfaces for supporting the front portions of a boat, said cradles being mounted on the front portion of said frame; a pair of transom support cradles having upper surfaces for supporting a transom of a boat on the trailer, said transom cradles being transversely spaced and each being pivotally mounted upon a pivot support means attached to the rear portion of said frame; a first of said pivot support means being selectively movable in a vertical plane parallel to the longitudinal axes of the frame; the second of said pivot support means being immobile relative to said frame; pivot support operating means for selectively moving said first pivot support means from a first raised position to a second lower position, and to selectively reverse this movement, the arrangement of said cradles and said keel rollers being such that when the first pivot support means is in a raised position the weight of a boat on the trailer is borne by the respective cradles and when the first pivot support means is in a lowered position at least a major portion of the weight of a boat on the trailer is borne by said keel rollers, said pivot support operating means including means pivotally supporting said first pivot support means, a lever arm fixed to said first pivot support means, a force multiplying leverage system connected with said lever arm, the pivotal mounting of said first pivot support means being so arranged that the latter must shift all weight borne thereby upward prior to shifting it downwardly, whereby weight imposed upon said first pivot support means in its raised position tends to prevent its shifting, in the absence of external force applied to said leverage sysstem, to its lower position.

5. A boat trailer including a frame, keel rollers on the frame, a pair of stern bolsters extending longitudinally of the rear portion of said frame at opposite sides thereof for engaging the hull of a boat having its keel resting on the keel rollers to support a portion of the weight of the boat, mounting means supporting the first of said bolsters, said mounting means being fixed against vertical movement relative to the frame, pivotal mounting means supporting the second of said bolsters, means for moving said pivotal mounting means in a vertical plane relative to said frame to move said second bolster into and out of a raised boat supporting position.

6. A boat trailer including a frame, keel rollers on the frame, a pair of stern bolsters extending longitudinally of the rear portion of said frame at opposite sides thereof for engaging the hull of a boat having its keel resting on the keel rollers to support a portion of the weight of the boat, mounting means supporting the first of said bolsters, said mounting means being fixed against vertical movement relative to the frame, pivotal mounting means supporting the second of said bolsters, means for moving said pivotal mounting means in a vertical plane relative to said frame to move said second bolster into and out of a raised boat supporting position, said last mentioned means including an over-the-center leverage system wherein the weight of the boat holds the second bolster in its raised position until the leverage system is operated against the weight of the boat to effect a lowering of the second bolster.

7. In a boat trailer the combination comprising a frame including a pair of spaced longitudinally extending side members; a plurality of brace members extending transversely between said side members; a plurality of longitudinally aligned keel rollers mounted between said side members; a pair of transom supporting cradles having an upper surface for supporting a transom of a boat on the trailer, said transom cradles being transversely spaced one from the other and mounted on the rear portion of said frame, the first of said transom supporting cradles being mounted on means fixed against vertical movement relative to the frame, the second of said transom cradles being mounted for selective vertical movement of at least one portion thereof relative to the means for mounting the first of said transom cradles; selectively operable lever means for effecting vertical movement of said last-mentioned portion of said second transom cradle, the arrangement being such that when said portion of said second transom cradle is in a raised position at least a major portion of the weight of the boat is borne by the respective transom cradles and when said portion of said second transom cradle is in a lowered position at least a major portion of the weight of a boat on the trailer is borne by said keel rollers.

8. A boat trailer including a frame, keel rollers on the frame, a pair of stern bolsters mounted at the rear portion of said frame at opposite sides thereof for engaging the hull of a boat having its keel resting on the keel rollers to support a portion of the weight of the boat, mounting means supporting the first of said bolsters, said mounting means being fixed against vertical movement relative to the frame, pivotal mounting means supporting the second of said bolsters, means for moving said pivotal mounting means in a vertical plane relative to said frame to move said second bolster into and out of a raised boat supporting position.

No references cited.

GERALD M. FORLENZA, *Primary Examiner.*

HUGO O. SCHULZ, *Examiner.*